(12) United States Patent
Limonad et al.

(10) Patent No.: US 10,824,955 B2
(45) Date of Patent: Nov. 3, 2020

(54) ADAPTIVE WINDOW SIZE SEGMENTATION FOR ACTIVITY RECOGNITION

(71) Applicant: International Business Machines Corporation, Armink, NY (US)

(72) Inventors: Lior Limonad, Nesher (IL); Nir Mashkif, Ein Carmel (IL); Ari Volcoff, Yokneam Ilit (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 15/091,589

(22) Filed: Apr. 6, 2016

(65) Prior Publication Data

US 2017/0300822 A1  Oct. 19, 2017

(51) Int. Cl.
| | | |
|---|---|---|
| *G06N 5/04* | (2006.01) | |
| *G06F 17/14* | (2006.01) | |
| *G06N 20/00* | (2019.01) | |
| *G06K 9/00* | (2006.01) | |
| *G06K 9/62* | (2006.01) | |

(52) U.S. Cl.
CPC ........... *G06N 5/047* (2013.01); *G06F 17/142* (2013.01); *G06K 9/00348* (2013.01); *G06K 9/00536* (2013.01); *G06K 9/6273* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,020,871 B2 | 4/2015 | Lane et al. | |
| 2008/0119750 A1* | 5/2008 | Patangay | A61B 7/04 600/528 |
| 2011/0098933 A1* | 4/2011 | Ochs | A61B 5/14551 702/19 |
| 2013/0317379 A1* | 11/2013 | Brimer | A61B 5/087 600/538 |
| 2014/0038674 A1 | 2/2014 | Srinivasan et al. | |
| 2014/0066780 A1* | 3/2014 | McQueen | A61B 5/0002 600/473 |
| 2014/0108324 A1* | 4/2014 | Chen | G06F 17/18 706/52 |
| 2014/0136696 A1 | 5/2014 | Leppanen et al. | |

(Continued)

OTHER PUBLICATIONS

Chua et al. (Behaviour Recognition from Sensory Streams in Smart Environments, Dec. 2009, pp. 666-675) (Year: 2009).*

(Continued)

*Primary Examiner* — George Giroux

(57) ABSTRACT

A computer-implemented method, computerized apparatus and computer program product for activity recognition using adaptive window size segmentation of sensor data stream. A data stream generated by one or more sensors is obtained. A frequency analysis of the data in a first segment of the data stream is performed. A size of a second segment is determined based on the frequency analysis. Activity recognition is performed for the second segment by extracting one or more features of the data therein and applying a machine learning process on the extracted features to obtain a classification of the data into an activity class.

20 Claims, 5 Drawing Sheets

(56) References Cited

U.S. PATENT DOCUMENTS

| | | | |
|---|---|---|---|
| 2014/0191955 A1 | 7/2014 | Raffa et al. | |
| 2014/0278139 A1* | 9/2014 | Hong | A61B 5/4866 702/19 |
| 2015/0045699 A1 | 2/2015 | Mokaya et al. | |
| 2015/0204722 A1* | 7/2015 | Yasui | G01J 3/453 250/339.08 |
| 2015/0248556 A1* | 9/2015 | Sickendick | G06F 21/563 726/23 |
| 2016/0097716 A1* | 4/2016 | Gulati | A61B 5/02416 250/339.01 |

OTHER PUBLICATIONS

Telgarsky (Dominant Frequency Extraction, Jun. 2013, pp. 1-12) (Year: 2013).*
Beichen Chen et al., "Activity Recognition Based on Streaming Sensor Data for Assisted Living in Smart Homes", Intelligent Environments (IE), 2015 International Conference on Date of Conference: Jul. 15-17, 2015, pp. 124-127.
Diane J. Cook et al., "Activity Discovery and Activity Recognition: A New Partnership", Published in: IEEE Transactions on Cybernetics (vol. 43 , Issue: 3 ) pp. 826-828, ISSN : 2168-2267.

* cited by examiner

ADAPTIVE WINDOW SIZE SEGMENTATION FOR ACTIVITY RECOGNITION

TECHNICAL FIELD

The present disclosure relates to data stream processing in general, and to adaptive window size segmentation of sensor data stream for activity recognition, in particular.

BACKGROUND

In many practical applications, as well as in research contexts, the use of data measurements gathered by one or more sensors deployed at a site of interest and being analyzed mathematically or statistically in order to detect certain events or patterns, is a common endeavor.

One field rapidly involving is of activity recognition, primarily through use of wearable sensors, namely, sensors that can be mounted on a person for monitoring occurrences or phenomena related thereto. Exemplary domains of recent applications for wearable sensors range from recreational and entertainment industries, such as gaming, fitness training and film making, through medical research and healthcare services, and up to personal safety and wellness securing in general.

Typically, when dealing with sensory data, the task of activity recognition entails receiving continuous data streams as an input, and classifying the raw data into one of several domain specific activities. For example, it is common to use a sensor such as an accelerometer, yielding 3-axis acceleration measures, to determine whether a person is standing, walking, sitting, running, jumping, or the like. To this end, one approach being employed is a multi-staged procedure, in which at first the raw data is grouped into consecutive segments, referred to as "windows", each containing a finite set of data samples. The raw data in each window is then analyzed to derive a series of computed indicators, referred to as "features", such as, for example, mean, variance, maximum, minimum, median crossings, frequency distribution, or the like. Finally, the concluded set of features is provided as input to one or more classification algorithms Numerous machine learning techniques, such as decision trees, support vector machines, k-Nearest Neighbors (k-NN), neural networks, Bayesian networks, and the like, may be used for this purpose. The process may further include an initial training or learning phase, in which different activities are being captured using the sensors, and a vector of features computed for the raw data is recorded along with an indication of the actual activity performed. The underlying assumption is that for each activity, there is a prototypical vector of features representing it, thus a trained classifier after having been exposed to enough recorded examples would be able to determine the type of activity based on a given feature vector.

BRIEF SUMMARY

One exemplary embodiment of the disclosed subject matter is a computer-implemented method comprising: obtaining a data stream generated by one or more sensors; performing frequency analysis of the data in a first segment of the data stream; determining, based on the frequency analysis, a size of a second segment; and performing activity recognition for the second segment, wherein the activity recognition is performed by extracting one or more features of the data in the second segment and applying a machine learning process thereon to obtain a classification of the data into an activity class.

Another exemplary embodiment of the disclosed subject matter is a computerized apparatus having a processor, the processor being adapted to perform the steps of: obtaining a data stream generated by one or more sensors; performing frequency analysis of the data in a first segment of the data stream; determining, based s on the frequency analysis, a size of a second segment; and performing activity recognition for the second segment, wherein the activity recognition is performed by extracting one or more features of the data in the second segment and applying a machine learning process thereon to obtain a classification of the data into an activity class.

Yet another exemplary embodiment of the disclosed subject matter is a computer program product comprising a computer readable storage medium retaining program instructions, which program instructions when read by a processor, cause the processor to perform a method comprising: obtaining a data stream generated by one or more sensors; performing frequency analysis of the data in a first segment of the data stream; determining, based on the frequency analysis, a size of a second segment; and performing activity recognition for the second segment, wherein the activity recognition is performed by extracting one or more features of the data in the second segment and applying a machine learning process thereon to obtain a classification of the data into an activity class.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
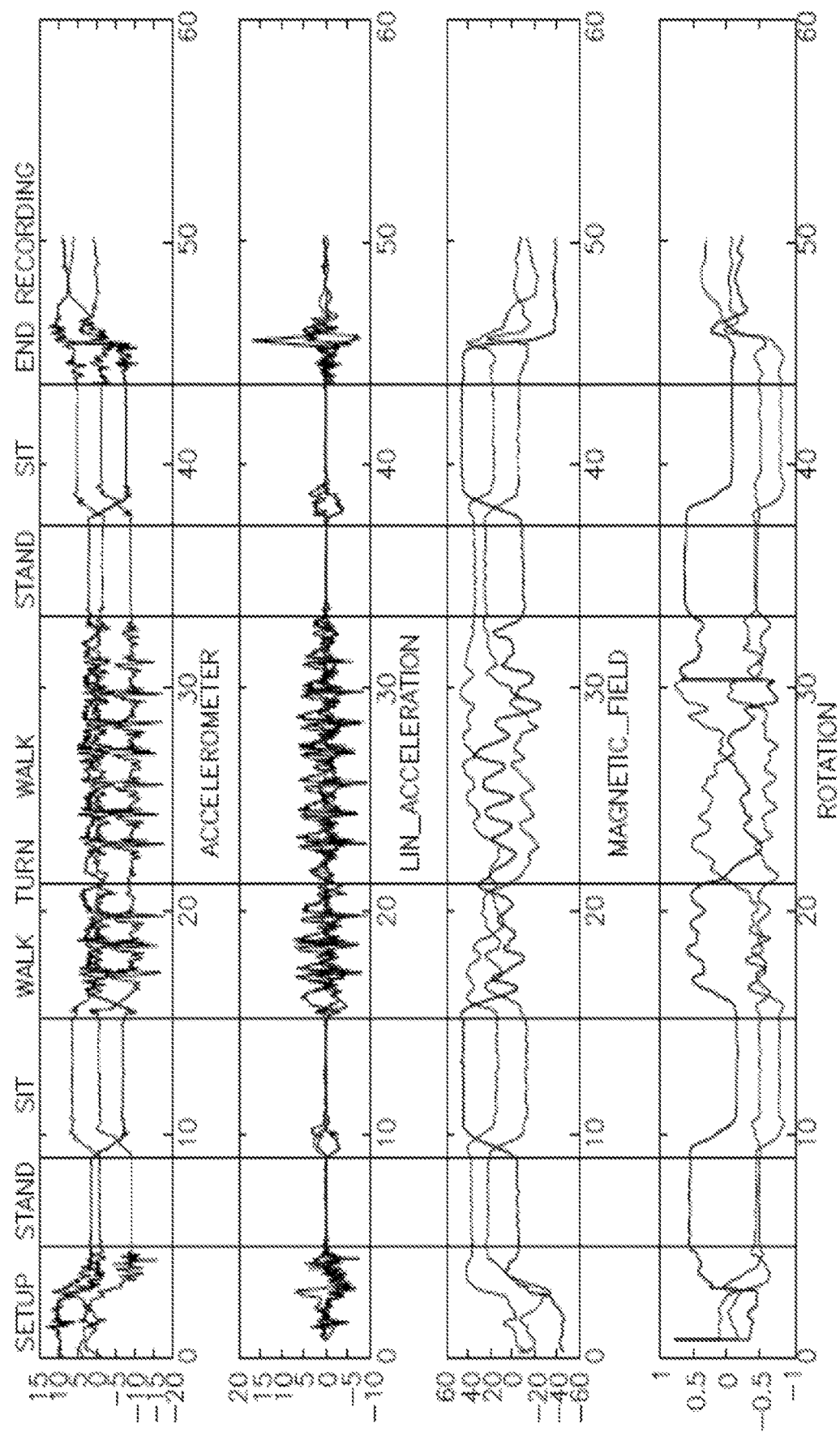
FIG. 1 shows a schematic illustration of multiple sensor data streams recording various activities, in accordance with some exemplary embodiments of the subject matter.

Under the multi-staged approach to activity recognition, the raw data is segmented into windows of a predetermined size, usually in match with a certain time period. Thus, the size of the window, i.e. duration of sampling, combined with the original frequency of the sensor producing the data, determines the number of data samples contained in each window and used for classification of the activity performed during this time period. Consequently, the window size also reflects a trade-off between accuracy and speed, as a too small sample size might lead to classification errors, on the one hand, while a larger sample could result in a longer response time, and also even in spillovers between data portions belonging to separate activity classes, on the other hand.

A similar adverse effect may be caused due to incompatibility between the cut off points applied in the segmentation and the temporal characteristics of the recorded data. As transition from one activity state to another may occur at any point, an arbitrary selection of segments durations, such as when using uniform, fixed size windows, may not allow a proper account of the underlying data. In case the selected window is of a duration that is not in sync with the actual frequency of the activity being monitored, the resulting sample is susceptible to inconsistencies in measurements of features and volatility among classifications of similar data measurements across preceding or subsequent segments.

One technical problem dealt with by the disclosed subject matter is to improve accuracy of activity recognition.

Another technical problem dealt with by the disclosed subject matter is to dynamically adapt the size of each sampling window to ensure that the data sampling is congruent with the actual rate or period of the recorded activity.

Yet another technical problem dealt with by the disclosed subject matter is to segment a stream of sensory data in conformity with transitions between different activities captured therein.

One technical solution is to use a two-staged data segmentation approach, wherein a first data segment is used to determine a dominant frequency of the data, and a second data segment, which is sized according to the dominant frequency, is used as the sampling window for which activity recognition is performed, i.e. by computing and labeling the various classification features. The size of the second segment may be determined based on a time length that best fits the most dominating frequency. For example, the size of the second segment may be inversely proportional to the dominating frequency. The dominating frequency may be determined using frequency analysis, such as by computing a Fast Fourier Transform (FFT) and selecting the frequency with the maximal power spectrum. Additionally or alternatively, other indicators or proxies for measuring periodicity in the data may be used, such as counting the number of median crossings per time unit or the like.

In some exemplary embodiments, the second segment may be contained in the first segment. The first segment may also be used as a buffer for the second segment and its size may be adjusted accordingly. For example, the size of the first segment may be increased in case that it is too small to contain a whole cycle of the activity, or decreased if it is too large, e.g. longer than double the period of the activity.

In some exemplary embodiments, the first segment may be a sliding window over the data stream, and the second segment may be a sliding window over the first segment.

In the context of the present disclosure, the data segment used for determining the most significant frequency component is also referred to as "external window", and the data segment used for determining the activity classification is also referred to as "internal window".

It will be appreciated that while in the context of the present disclosure, activities that are being recorded and identified may be periodic, such as, for example, activities of repetitive movements, like walking or running, the disclosed subject matter, however, is not limited in such manner and may be employed in recognition of activities that are not repetitive as well.

It will also be appreciated that while the present disclosure is focused primarily in continuing activities, e.g., riding in a car or performing iterative manual labor, such as fruit-picking or the like, the disclosed subject matter may also be utilized in the context of transient or momentary actions recognition. In particular, state transitions may also be considered as distinct activities in some exemplary embodiments of the disclosed subject matter.

One technical effect of utilizing the disclosed subject matter is to ensure that the window that is actually used for feature calculation maintains better congruence with the actual frequency of the activity being monitored, along with consistency of feature measurements across consecutive windows of the same activity.

Another technical effect of utilizing the disclosed subject matter is to improve accuracy of activity recognition and shorten the response time, whereby the consumption of resources, such as communication bandwidth, energy supply, or the like, may also be streamlined and optimized accordingly.

Referring now to FIG. 1 showing a schematic illustration of multiple sensor data streams recording various activities, in accordance with some exemplary embodiments of the subject matter.

In some exemplary embodiments, a plurality of sensors may generate data streams comprising series of measurements along a given time period. The sensors may be adapted to measure a certain physical property, such as, for example, proper acceleration (i.e., gradients in a gravitational field, as measured by an accelerometer), linear acceleration (i.e., rate of velocity change), magnetic field, rotation, or the like. The data measurements may be either single- or multi-dimensional, e.g. tri-dimensional measurements, such as depicted in FIG. 1. The data measurements may record one or more activities being performed during the time period.

In some exemplary embodiments, the sensors or a portion thereof may be wearable sensors or sensors mounted on a special purpose device. Additionally or alternatively, the sensors may be deployed on a portable device, such as a mobile phone, tablet computer, or the like, which may have integral or built-in accelerometer, gyroscope (for measuring orientation or tilt), electrical resistance or conductivity detector, and likewise sensors as part of a standard specification.

As exemplified in FIG. 1, the data measurements of the plurality of sensors may be recorded or registered together against a common time line. Each row may contain measurements obtained by one of the sensors, depicted as continuous signals, wherein the horizontal axis may denote the time units, e.g. in seconds, and the vertical axis may denote the values measured. The data measurements may be partitioned into segments based on the different kinds of activities recorded, as denoted by the top-to-bottom vertical lines. An indication of the corresponding labels of the activities performed may be also provided, such as denoted on top in the uppermost row of FIG. 1.

Figure 2A:
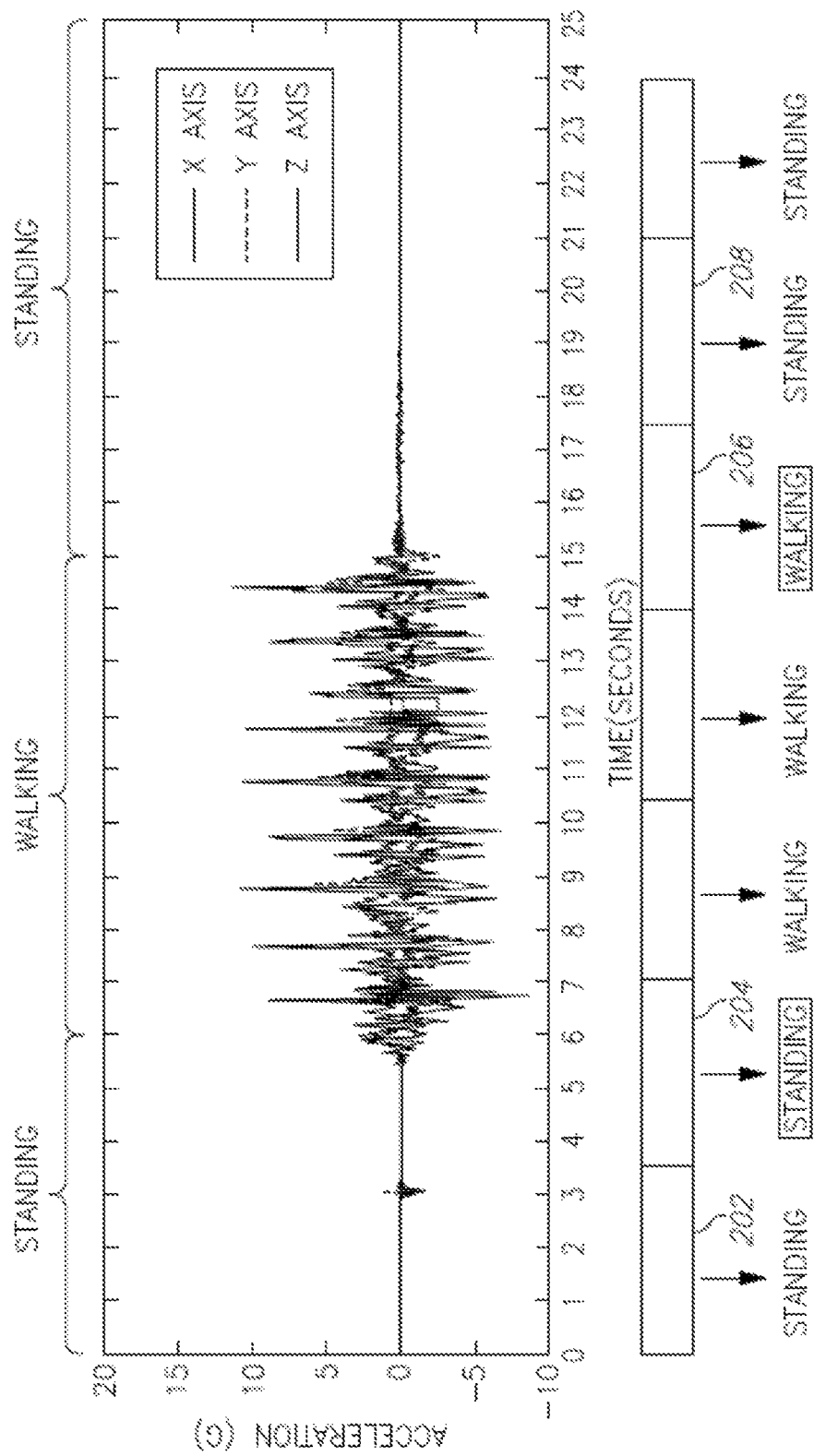
FIG. 2A shows a schematic illustration of activity recognition using a fixed window size segmentation, in accordance with some exemplary embodiments of the disclosed subject matter.

Referring now to FIG. 2A showing a schematic illustration of activity recognition using a fixed window size segmentation, in accordance with some exemplary embodiments of the disclosed subject matter.

A stream of sensory data, comprising measurements acquired over a continuous time period, may be provided as input for activity recognition. The data may comprise, for example, 3-axis acceleration measures, as yielded by an accelerometer, similarly as depicted in the first row from the top of FIG. 1. The data measurements may record several activities performed during the time period, such as walking, standing, or the like. The actual class of each of the activities performed in a given portion of the recording period, and which yielded the depicted measurements, is denoted on the top.

The raw data stream may be segmented into a plurality of windows, such as Window 202, Window 204, Window 206, and Window 208, as denoted in the lower part of FIG. 2A. For each of the obtained windows, an activity type may be determined, by calculating a feature vector for the data samples contained therein, and applying a classification model on the calculated features. Exemplary classification results for the respective windows per the given segmentation are denoted at the bottom below each window. Labels that are in mismatch with the actual activity class are marked by a rectangular frame.

As exemplified in FIG. 2A, lack of correspondence between the segmenting windows and the durations of the different activities might give rise to inaccurate or fuzzy classification results. In the exemplary segmentation illustrated in FIG. 2A, the plurality of windows all have a fixed size of about 3.5 seconds each, which may be arbitrarily predetermined. Consequently, due to possible state transition occurring intermittently, a window may contain a mixture of measurements recording different activity types, thus leading to erroneous or inconclusive detections. For example, the entirety of the data in Window 204 may be classified as standing activity, despite the fact that in the last portion of Window 204 begins a walking activity. As a result, response to the walking activity is delayed by at least one time window. Similarly, Window 206 may be classified as walking activity, even though that in the lion's share of Window 206, the actual activity performed is standing, to which a transition occurs shortly after the starting point of Window 206.

Figure 2B:
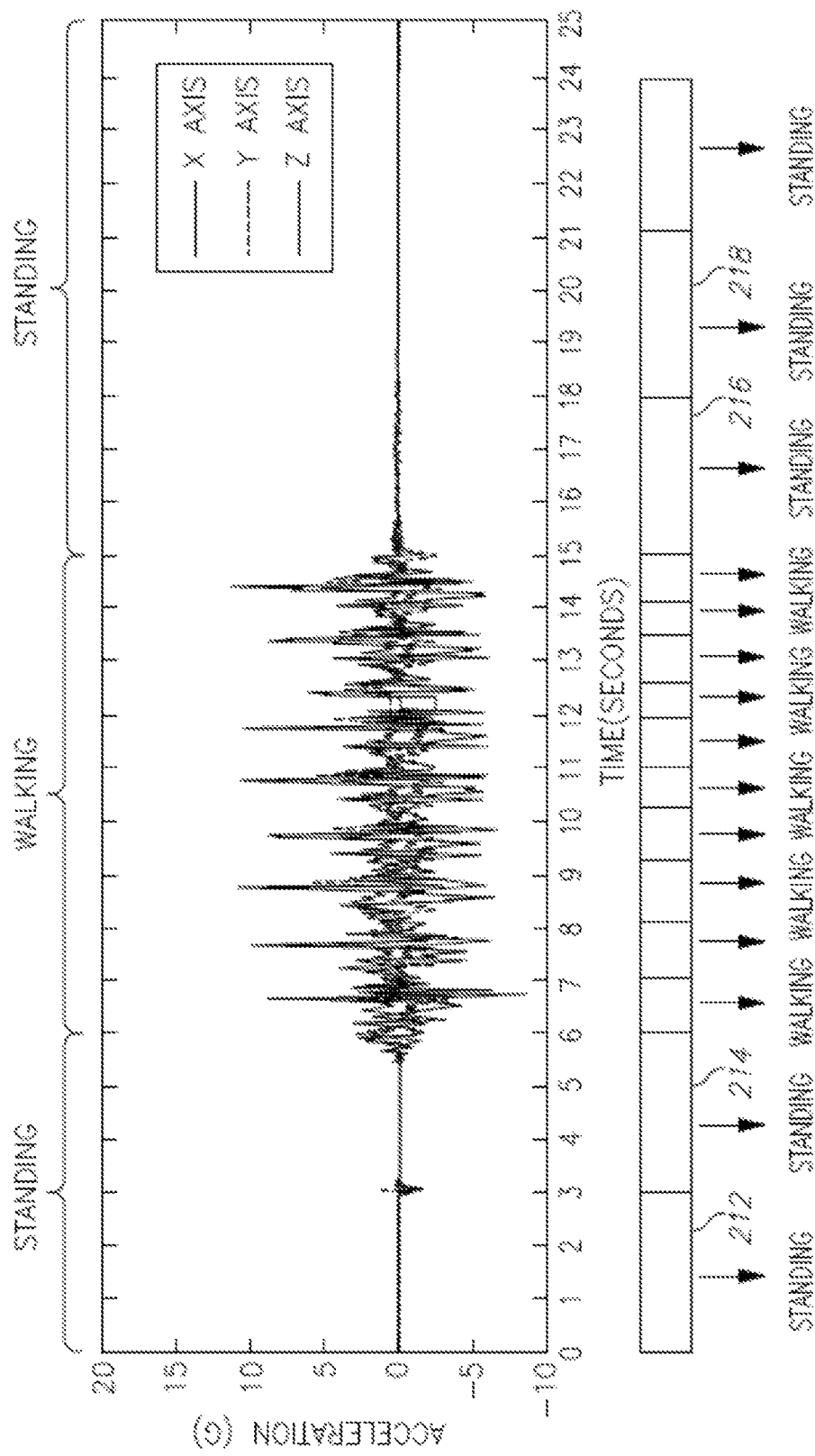
FIG. 2B shows a schematic illustration of activity recognition using an adaptive window size segmentation, in accordance with some exemplary embodiments of the s disclosed subject matter.

Referring now to FIG. 2B showing a schematic illustration of activity recognition using an adaptive window size segmentation, in accordance with some exemplary embodiments of the disclosed subject matter.

The same raw data stream depicted in FIG. 2A may be segmented into a plurality of windows, such as Window 212, Window 214, Window 216, and Window 218. The size of each window may be determined based on a frequency of the underlying activity. The frequency may be determined by analyzing a respective portion of the data prior to the segmentation to identify the dominating frequency component. In some exemplary embodiments, a two-staged segmentation, consisting of a pair of sliding windows, one external and one internal, may be employed. The external window (not shown) may be used for reading successive portions of the raw data and computing a dominant frequency in each, and the internal window may be used for segmenting the data in a manner befitting this frequency, such as illustrated in FIG. 2B.

As exemplified in FIG. 2B, data measurements recording a standing activity are segmented into windows of a size of about 3 seconds each, such as Windows 212 to 218, while measurements recording a walking activity are segmented into windows of about 0.5-1 seconds each, such as all windows between Windows 214 and 216. As the windows' lengths are congruent with the underlying frequencies, their starting and ending points are also in sync with the transition points, such as at the termination point of Window 214 or the outset of Window 216. Consequently, the data samples contained in each of the plurality of windows thus obtained may be correctly classified. Additionally or alternatively, response time to activity change may be in better fit in comparison to the response time resulting from arbitrary segmentation such as depicted in FIG. 2A.

Figure 3:
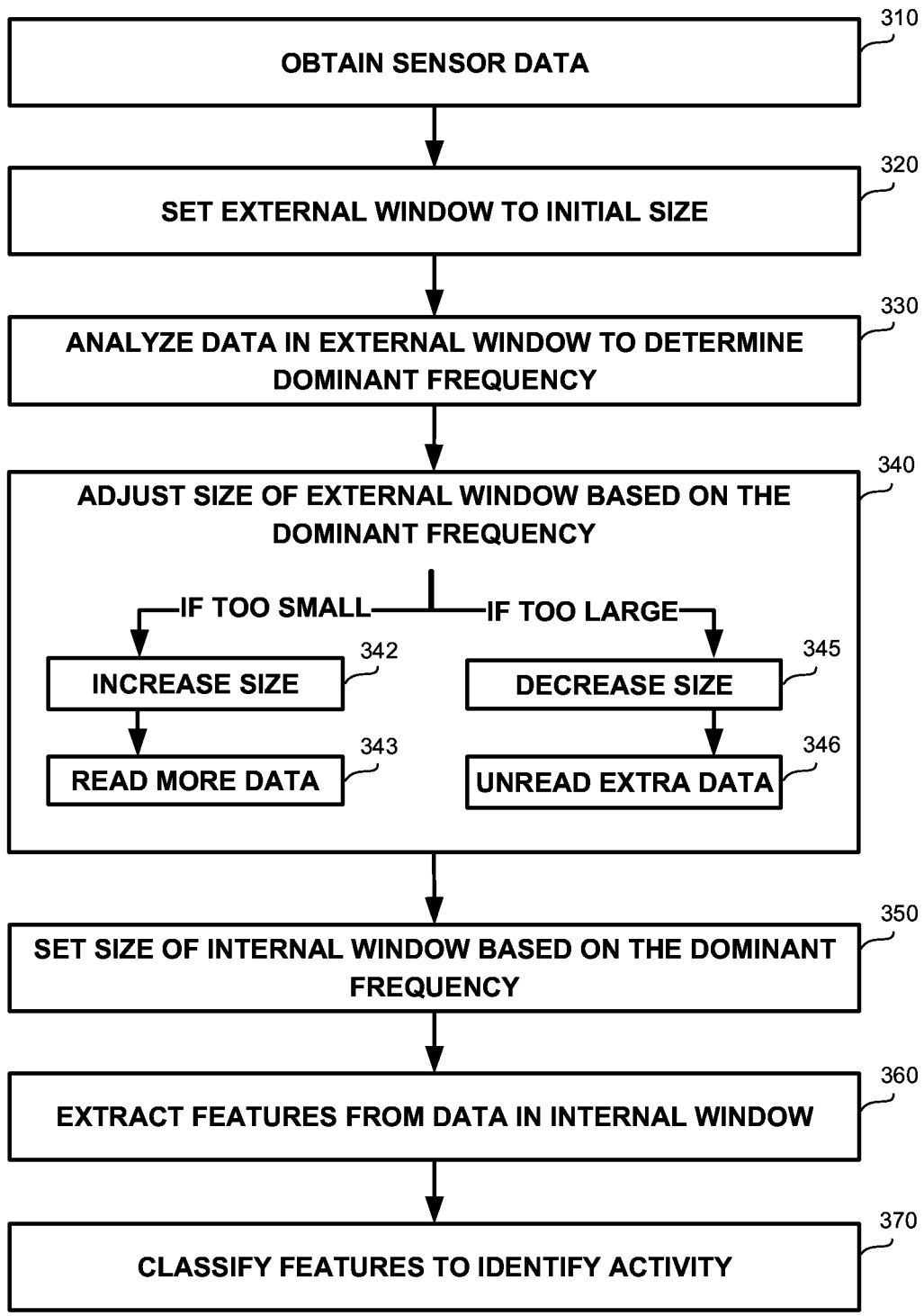
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

On Step 310, a stream of data measurements generated by one or more sensors may be obtained. The sensors may record various activities performed during a given time period. The sensors may be of different kinds, such as, for example, sensors for measuring proper or linear acceleration, orientation, magnetic field, electrical resistance or conductivity, or the like.

On Step 320, an external window, used for computing a frequency of an activity recorded in the data stream obtained in Step 310, may be set to an initial size. The initial size may be an arbitrary default value, such as, for example, a few seconds long.

In some exemplary embodiments, the external window may be used as a buffer for an internal window, which in turn is used as the actual sampling window for which a feature vector may be extracted and classified. Accordingly, successive segments from the data stream may be read iteratively into the external window in accordance with its size, until the entire data stream has been processed. Once the size of the external window is initially set, data from the input stream may be read thereto to obtain a first data segment (not shown).

On Step 330, the data in the external window may be analyzed to determine a dominant frequency component thereof. The frequency analysis may be performed by applying FFT on the data and identifying a peak of spectral energy in the frequency domain. Additionally or alternatively, other periodicity measures may be used, such as, for example, median crossings count or the like.

In some exemplary embodiments, in case that more than one dominating frequency is found, such as may happen, for example, in an activity like hurdle racing, where runners also jump over obstacles evenly spaced from one another, the frequency which is the lowest among them may be selected as dominant, such that a greater window size may be obtained on subsequent stages of the method of FIG. 3.

On Step 340, the size of the external window may be adjusted based on the dominant frequency determined on Step 330. In case that the external window is too small, e.g. shorter than about a single period of the underlying activity, as reflected in the dominant frequency, the size of the external window may be increased on Step 342. Similarly, in case that the external window is too large, e.g. longer than about two periods, the size of the external window may be decreased on Step 345.

In some exemplary embodiments, where the external window may also serve as a buffer for the internal window, the contents of the external window may be adapted accordingly based on the adjusted size. Thus, in case of a size increase, more data may be read into the external window on Step 343. Similarly, in case of a size decrease, on Step 346, extra data in the external window may be unread, i.e. put back to its place in the input stream, together with the remaining unprocessed measurements.

On Step 350, a size of an internal window, used for segmenting the data into samples for which feature extraction and activity classification are performed, may be set based on the dominant frequency, as determined on Step 330. The size of the internal window may be inversely proportional to the dominant frequency. For example, the size may be set so that a single period of the activity is fitted within the internal window. In some exemplary embodiments, data may be read into the internal window from the external window, in accordance with the size set for the internal window.

On Step 360, one or more features may be extracted from the data samples contained in the internal window, as obtained per the size set for the internal window on Step 350. The extracted features may include statistical measures, such as mean, minimum, maximum, standard deviation, variance, median, or the like, analytical measures, such as Power Spectral Density (PSD) or the like, and so forth.

On Step 370, an activity type may be identified by classifying the features calculated on Step 360 using a machine learning process. In some exemplary embodiments, a supervised learning approach may be employed, wherein the classification model undergoes a preliminary training stage in which exemplary instances of data samples are introduced to the model along with labels indicating the type of activity recorded in each of them. Additionally or alternatively, unsupervised learning or semi-supervised learning may be employed.

Figure 4:
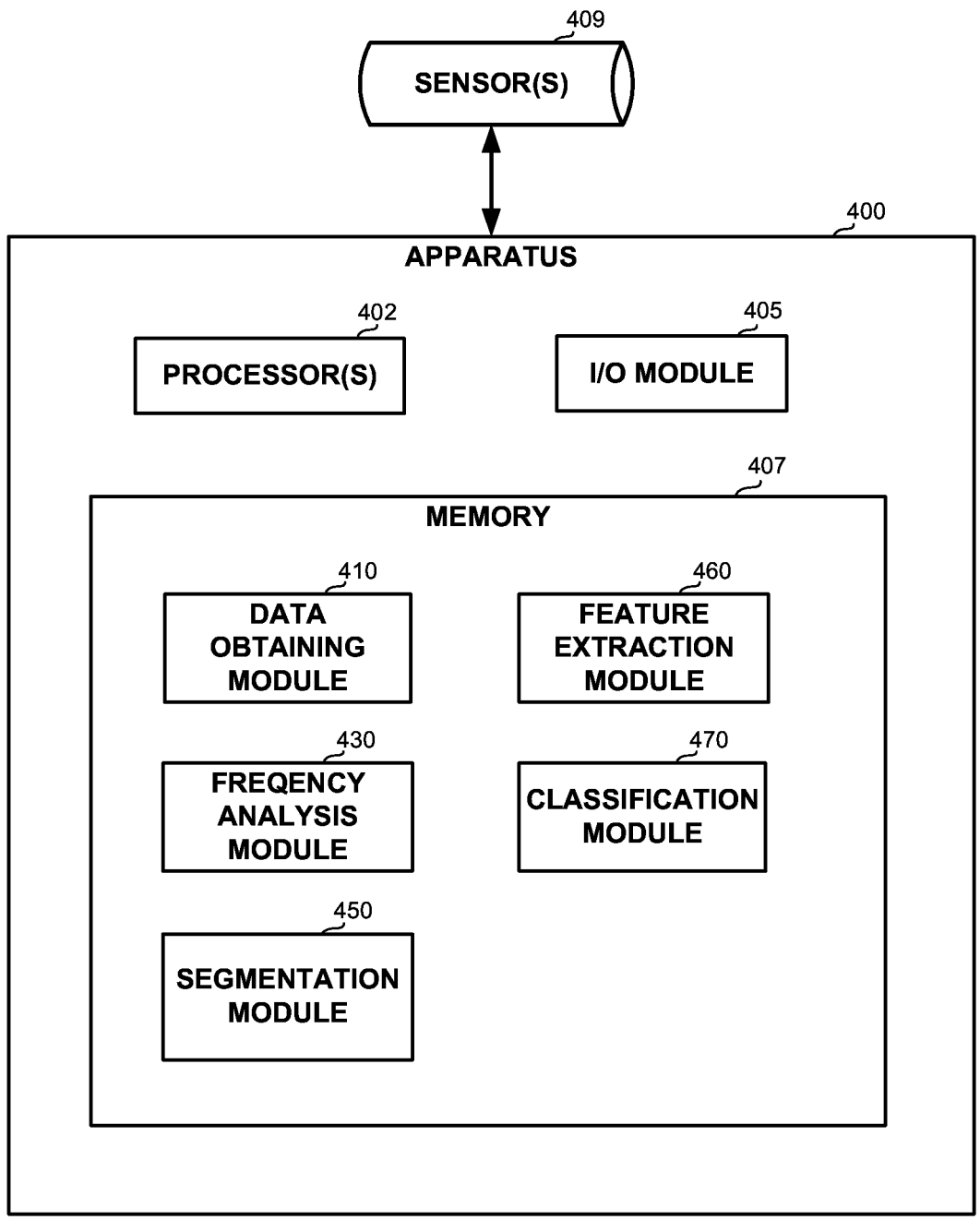
FIG. 4 shows a block diagram of an apparatus, in accordance with some exemplary embodiments of the disclosed subject matter.

Referring now to FIG. 4 showing a block diagram of an apparatus in accordance with some exemplary embodiments of the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) Module 405. I/O Module 405 may be utilized to provide an output to and receive input from a user or another Apparatus 400 in communication therewith.

In some exemplary embodiments, Apparatus 400 may comprise a Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400.

In some exemplary embodiments, Apparatus 400 may be coupled with one or more Sensor(s) 409. Sensor 409 may be configured for recording or generating measurements related to or arising from one or more activities being monitored. For example, Sensor 409 may be an inertial sensor configured for measuring movements, such as an accelerometer, a gyroscope, or the like. Sensor 409 may be either an on-board sensor embedded in Apparatus 400, or a stand-alone sensor deployed at a site of interest and being in communication with Apparatus 400 via any available channel, such as, for example, the Internet. In some exemplary embodiments, Sensor 409 may be a wearable sensor.

Data Obtaining Module 410 may be configured for receiving a data stream generated by one or more sensors, such as Sensor 409, similarly as in Step 310 of FIG. 3. In some exemplary embodiments, Data Obtaining Module 410 may be configured for receiving supervised data, comprising measurements instances and associated labels thereof, for training one or more machine learning classifiers. In some exemplary embodiments, Memory 407 may be configured for caching at least a portion of the data obtained by the Data Obtaining Module 410 coming from the input stream (i.e., of Sensor 409).

Frequency Analysis Module 430 may be configured for performing frequency analysis to a given portion of the data stream obtained by Data Obtaining Module 410. Frequency Analysis Module 430 may be further configured for determining a dominant frequency in a series of sensor measurements, such as contained in a certain stream segment, e.g. a segment used as external window, similarly as in Step 330 of FIG. 3.

In some exemplary embodiments, Frequency Analysis Module 430 may apply FFT on the data and detect a frequency where the energy is maximal. Additionally or alternatively, Frequency Analysis Module 430 may compute one or more other periodicity measures, such as a count of median crossings per time unit or the like.

Segmentation Module 450 may be configured for segmenting the data stream obtained by Data Obtaining Module 410 into a plurality of windows to be processed by one or more other modules of Apparatus 400. Segmentation Module 450 may be configured to segment the data stream into preliminary segments to be analyzed by Frequency Analysis Module 430 for determining a dominant frequency therein. Segmentation Module 450 may be further configured to re-segment the data stream into windows of an adaptive size matching the dominant frequencies in each of the respective portions, where, for each of which windows, features may be extracted and classified to recognize an activity recorded therein.

In some exemplary embodiments, Segmentation Module 450 may be configured for initializing an external window with a default size, such as in Step 330 of FIG. 3, adjusting the size of the external window based on the dominant frequency determined by Frequency Analysis Module 430, such as in Step 340 of FIG. 3, and setting an internal window with a size in accordance with the dominant frequency, as in Step 350 of FIG. 3. In some exemplary embodiments, Segmentation Module 450 may use the external window as a buffer for the internal window.

Feature Extraction Module 460 may be configured for calculating a feature vector for a given data segment, such as the windows obtained by Segmentation Module 450, similarly as in Step 360 of FIG. 3. Feature Extraction Module 460 may be configured to extract features such as mean, variance, minimum, maximum, median, PSD, or the like.

Classification Module 470 may be configured for determining an activity class of a given data sample based on a feature vector extracted therefrom, such as in Step 370 of FIG. 3. In some exemplary embodiments, Classification Module 470 may be configured to receive the feature vector computed by Feature Extraction Module 460 and apply a machine learning process thereon to obtain a recognition of the underlying activity. In some exemplary embodiments, Classification Module 470 may be further configured to receive a label indicating the respective activity class of a feature vector received, as part of a training phase of the machine learning process.

Embodiment

Some exemplary embodiments of the disclosed subject matter may implement the following pseudo-code, using two windows implemented as queues, where the operator "enqueue" adds elements to the queue, up to its full capacity, and the operator "dequeue" removes elements from the queue:

```
function FFT_Adaptive_Stream_Processing(Queue Input)
Begin
let: Queue eQ, iQ //eQ – external widow; iQ – internal window
eq.capacity ← 3 // initial capacity set to 3 seconds (arbitrary size)
While input.hasData
    eQ.enqueue ← input.dequeue // read more data from input ("sliding
    window")
    f_max ← FFT(eQ).maxFrequency // dominant frequency computed If eQ.capacity < $\frac{1}{f_{max}}$ // if external window is too small then eQ.capacity ← $\frac{2}{f_{max}}$ // increase its size eQ.enqueue ← input.dequeue // read more data from input ElseIf eQ.capacity > $\frac{2}{f_{max}}$ // if external window is too large then input.enqueue ← eQ.dequeue // put back the buffered data eQ.capacity ← $\frac{1}{f_{max}}$ // decrease its size eQ.enqueue ← input.dequeue // read again per the new capacity
    EndIf iQ.capacity ← $\frac{1}{f_{max}}$ // set the size of the internal window iQ.capacity ← eQ.dequeue    // move data from external window,
                                // up to capacity limit
    F ← features(iQ) // calculate features of the data in the internal window
    A ← classify(F) // identify activity using calculated features
    iQ.clearAll // empty internal window
EndWhile
End
```

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram s block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    obtaining a data stream generated by one or more sensors;
    performing frequency analysis of data in a first segment of a first sliding window over the data stream;
    determining, based on the frequency analysis, a size of a second sliding window over the first segment and adjusting, based on the frequency analysis, the size of the first sliding window used for the frequency analysis; and
    performing activity recognition for a second segment of the second sliding window, wherein the activity recognition is performed by extracting one or more features of the data in the second segment and applying a machine learning process thereon to obtain a classification of the data into an activity class, the one or more features comprising a power spectral density of the data of the second segment and wherein the activity class corresponds to a sitting activity, a standing activity, or a walking activity of a user associated with the one or more sensors.

2. The computer-implemented method of claim 1, wherein the frequency analysis comprises determining a dominant frequency, wherein the size of the second segment is inversely proportional to the dominant frequency.

3. The computer-implemented method of claim 1, wherein the second segment is contained in the first segment.

4. The computer-implemented method of claim 1, wherein the size of the first segment is increased responsive to being below $1/f_{max}$, wherein $f_{max}$ is the dominant frequency.

5. The computer-implemented method of claim 1, wherein the size of the first segment is decreased responsive to being above $2/f_{max}$, wherein $f_{max}$ is the dominant frequency.

6. The computer-implemented method of claim 1, wherein the first segment is obtained by iteratively reading successive segments from the data stream.

7. The computer-implemented method of claim 1, wherein the second segment is obtained by iteratively reading successive segments from the first segment.

8. The computer-implemented method of claim 1, wherein the frequency analysis is performed using Fast Fourier Transform (FFT).

9. The computer-implemented method of claim 1, wherein the activity class is of a repetitive activity.

10. The computer-implemented method of claim 1, wherein the one or more sensors are wearable sensors.

11. The computer-implemented method of claim 1, wherein the frequency analysis is performed by counting a number of median crossings per time unit.

12. A computerized apparatus having a processor, the processor being adapted to perform the steps of:
    obtaining a data stream generated by one or more sensors;
    performing frequency analysis of data in a first segment of a first sliding window over the data stream;
    determining, based on the frequency analysis, a size of a second sliding window over the first segment and adjusting, based on the frequency analysis, the size of the first sliding window used for the frequency analysis; and
    performing activity recognition for a second segment of the second sliding window, wherein the activity recognition is performed by extracting one or more features of the data in the second segment and applying a machine learning process thereon to obtain a classification of the data into an activity class, the one or more features comprising a power spectral density of the data of the second segment and wherein the activity class corresponds to a sitting activity, a standing activity, or a walking activity of a user associated with the one or more sensors.

13. The computerized apparatus of claim 12, wherein the frequency analysis comprises determining a dominant frequency, wherein the size of the second segment is inversely proportional to the dominant frequency.

14. The computerized apparatus of claim 12, wherein the second segment is contained in the first segment.

15. The computerized apparatus of claim 12, wherein the processor is further adapted to adjust the size of the first sliding window based on the frequency analysis.

16. The computerized apparatus of claim 12, wherein the first segment is obtained by iteratively reading successive segments from the data stream.

17. The computerized apparatus of claim 12, wherein the second segment is obtained by iteratively reading successive segments from the first segment.

18. The computerized apparatus of claim 12, wherein the frequency analysis is performed using Fast Fourier Transform (FFT).

19. The computerized apparatus of claim 12, wherein the activity class is of a repetitive activity.

20. A non-transitory computer program product comprising a computer readable storage medium retaining program instructions, which program instructions when read by a processor, cause the processor to perform a method comprising:

obtaining a data stream generated by one or more sensors;

performing frequency analysis of data in a first segment of a first sliding window over the data stream;

determining, based on the frequency analysis, a size of a second sliding window over the first segment and adjusting, based on the frequency analysis, the size of the first sliding window used for the frequency analysis; and performing activity recognition for a second segment of the second sliding window, wherein the activity recognition is performed by extracting one or more features of the data in the second segment and applying a machine learning process thereon to obtain a classification of the data into an activity class, the one or more features comprising a power spectral density of the data of the second segment and wherein the activity class corresponds to a sitting activity, a standing activity, or a walking activity of a user associated with the one or more sensors.

* * * * *